US009841953B2

(12) United States Patent
Laskey et al.

(10) Patent No.: US 9,841,953 B2
(45) Date of Patent: Dec. 12, 2017

(54) PLUGGABLE COMPONENTS FOR RUNTIME-IMAGE GENERATION

(71) Applicant: Oracle International Corporation, Redwood Shores, CA (US)

(72) Inventors: James M. Laskey, Lunenburg (CA); Jean-Francois Denise, Biviers (FR)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/210,447

(22) Filed: Jul. 14, 2016

(65) Prior Publication Data
US 2017/0052764 A1 Feb. 23, 2017

Related U.S. Application Data

(60) Provisional application No. 62/208,410, filed on Aug. 21, 2015.

(51) Int. Cl.
*G06F 9/44* (2006.01)
*G06F 9/45* (2006.01)
*G06F 9/455* (2006.01)

(52) U.S. Cl.
CPC .......... *G06F 8/31* (2013.01); *G06F 8/41* (2013.01); *G06F 8/52* (2013.01); *G06F 9/45504* (2013.01)

(58) Field of Classification Search
CPC ........................................................ G06F 9/44
USPC ................................................. 717/111–118
See application file for complete search history.

(56) References Cited

U.S. PATENT DOCUMENTS

| 2003/0217255 A1* | 11/2003 | Wyatt ............ G06F 9/4411 713/100 |
| 2013/0086578 A1* | 4/2013 | Eilam ............ G06F 9/45558 718/1 |
| 2013/0169987 A1* | 7/2013 | Akiyama ........ G06F 9/44505 358/1.13 |

OTHER PUBLICATIONS

Clang Tutorial—Clang Plugins—Clang 4.0 Documentation—downloaded from the web Aug. 2, 2016, http://clang.llvm.org/docs/ClangPlugins.html.
Slang Tutorial—Bits, Bytes, Boos—Programming tips, kernel hacking, Android computing, research and more. Clang Tutorial Part III: Plugin Example Jul. 23, 2013.
GCC Development—23.2 Plugin API—downloaded from the web Aug. 2, 2016, https://gcc.gnu.org/onlinedocs/gccint/Plugin-API.html.

(Continued)

*Primary Examiner* — Jae Jeon
(74) *Attorney, Agent, or Firm* — Park, Vaughan, Fleming & Dowler LLP (57) ABSTRACT

The disclosed embodiments provide a system that facilitates controlling and customizing the process of generating a software program image. During operation, the system receives a set of files for building a software program, wherein at least one of the files in the set is an intermediate code file that was at least partially compiled from a source code file of the software program. The system then applies a plurality of pluggable transforms to a plurality of states of the set of files to produce a particular subsequent state of the set of files. The system then produces a runtime-image of the software program from at least the particular subsequent state of the set of files, the runtime-image including one or more files for execution by a virtual machine and one or more output resources to be accessed by the one or more executed files.

17 Claims, 6 Drawing Sheets

(56) References Cited

OTHER PUBLICATIONS

GCC Development—23 Plugins—GCC loadable modules—downloaded from the web Aug. 2, 2016, https://gcc.gnu.org/onlinedocs/gccint/Plugins.html.
GCC Development—23.6 Registering custom attributes or pragmas, downloaded from the web Aug. 2, 2016, https://gcc.gnu.org/onlinedocs/gccint/Plugins-attr.html.
GCC Development—23.10 Building GCC plugins—downloaded from the web Aug. 2, 2016, https://gcc.gnu.org/onlinedocs/gccint/Plugins-building.html.
GCC Development—23.5 Giving Information about a plugin—downloaded from the web Aug. 2, 2016, https://gcc.gnu.org/onlinedocs/gccint/Plugins-description.html.
GCC Development—23.8 Controlling which passes are being run—downloaded from the web Aug. 2, 2016, https://gcc.gnu.org/onlinedocs/gccint/Plugins-gate.html.
GCC Development—23.3 Interacting with the pass manager—downloaded from the web Aug. 2, 2016, https://gcc.gnu.org/onlinedocs/gccint/Plugins-pass.html.
GCC Development—23.1 Loading Plugins—downloaded from the web Aug. 2, 2016, https://gcc.gnu.org/onlinedocs/gccint/Plugins-loading.html.
GCC Development—23.7 Recording Information about Pass Execution—downloaded from the web Aug. 2, 2016, https://gcc.gnu.org/onlinedocs/gccint/Plugins-recording.html.
GCC Development—23.9 Keeping track of available passes, downloaded from the web Aug. 2, 2016, https://gcc.gnu.org/onlinedocs/gccint/Plugins-tracking.html.

* cited by examiner

PLUGGABLE COMPONENTS FOR RUNTIME-IMAGE GENERATION

RELATED APPLICATION

This application claims priority under 35 U.S.C. §119 to U.S. Provisional Application No. 62/208,410, entitled "Pluggable Components for Runtime Image Generation," by the same inventors as the instant application, filed 21 Aug. 2015, the contents of which are incorporated by reference herein in their entirety.

BACKGROUND

Field

The disclosed embodiments relate to techniques for improving how software program images are generated. More specifically, the disclosed embodiments relate to techniques for customizing the process of deploying a software program to a target software environment.

Related Art

The steps for creating a program that targets a particular software environment generally include (1) writing source code in a programming language, (2) compiling the source code, and (3) linking the results of the compilation to generate a distribution that is able to execute in the target software environment. In some cases, a compiler may apply optimizations to the source code prior to the creation of the distribution.

However, the compiler may only apply function-wide or block-wide optimizations to the source code. Because there may be many independent units of compilation, the compiler may not have a view of all the pieces that will eventually make up the distribution. Without closed-world knowledge of the program, the compiler cannot apply certain whole-program optimizations without risk of breaking the source code. This may result in a distribution with a larger footprint and/or a slower execution. Additionally, the developer of the program or a user of the program may possess insights into the program that, but for their inability to control certain parts of the linking process, would enable them to provide optimizations that would improve the source code. Hence, what is needed is a system that enables one to customize the process of deploying a program to a target software environment.

SUMMARY

The disclosed embodiments provide a system that facilitates controlling and customizing the process of generating a software program image. During operation, the system receives a set of files for building a software program, wherein at least one of the files in the set is an intermediate code file that was at least partially compiled from a source code file of the software program. The system then applies a plurality of pluggable transforms to a plurality of states of the set of files to produce a particular subsequent state of the set of files. In some embodiments, applying the plurality of pluggable transforms to the plurality of states of the set of files includes:

(i) applying a particular pluggable transform to modify the intermediate code file into a particular transitional state of the intermediate code file; and
(ii) applying one or more subsequent pluggable transforms to modify the particular transitional state of the intermediate code file into one or more other transitional states of the intermediate code file.

The system then produces a runtime-image of the software program from at least the particular subsequent state of the set of files, the runtime-image including one or more files for execution by a virtual machine and one or more output resources to be accessed by the one or more executed files.

In some embodiments, applying the plurality of pluggable transforms further includes discovering at least one of the plurality of pluggable transforms.

In some embodiments the set of files further includes an input resource and applying the plurality of pluggable transforms further includes applying one or more other pluggable transforms to modify the input resource into one or more transitional states of the input resource, wherein at least one of the particular pluggable transform and the one or more subsequent pluggable transforms are applied exclusively to intermediate code files and at least one of the one or more other pluggable transforms are applied exclusively to input resources.

In some embodiments, a first set of intermediate code from which the runtime-image is to be produced is exposed to at least one of the plurality of pluggable transforms, the first set of intermediate code including a second set of intermediate code that is reachable by a process executing the software program.

In some embodiments, a modification performed by the at least one of the plurality of pluggable transforms depends on an assumption about the software program, wherein, to make the assumption, the at least one of the plurality of pluggable transforms considers the second set of intermediate code.

In some embodiments, a modification performed on one of the states of the intermediate code file includes discovering at least one intermediate code path that is not reachable at any point during the software program's execution.

In some embodiments, a modification performed on one of the states of the intermediate code file includes eliminating intermediate code that is not used at any point during the software program's execution.

In some embodiments, a modification performed on one of the states of the intermediate code file includes at least one of:
 (i) eliminating a duplicate calculation; and
 (ii) inlining a call to a routine.

In some embodiments, producing a runtime-image of the software program includes:
 (i) selecting an image builder from a set of image builders based on at least a target software environment on which the runtime-image will execute; and
 (ii) using the image builder to build the runtime-image from the particular subsequent state of the set of files.

In some embodiments, the set of image builders includes at least one of:
 (i) a builder for building statically-linked runtime-images;
 (ii) a builder for building runtime-images for one or more development environments; and
 (iii) a builder for building runtime-images for one or more embedded environments.

In some embodiments, modifications performed by the particular pluggable transform and the one or more subsequent pluggable transforms include at least one of:
 (i) a filtering of the intermediate code file;
 (ii) a sorting of the intermediate code file; and
 (iii) a compaction of the intermediate code file.

In some embodiments, modifications performed by the other pluggable transforms includes at least one of:
 (i) a filtering of the input resource;
 (ii) a conversion of the input resource; and (iii) a compaction of the input resource.

In some embodiments, each of the plurality of pluggable transforms belong to a category of pluggable transforms, wherein all pluggable transforms that belong to a first category of pluggable transforms are applied prior to applying any pluggable transforms that belong to a second category of pluggable transforms.

As described herein, first, second, third, and other ordinal adjectives are naming conventions that are not necessarily indicative of order unless otherwise functionally required.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating the development of a software program and the deployment of the program to a target software environment. To create the program, a developer may write source code in a high-level programming language. From the source code, a distribution of the program may be generated. The distribution, which may be in the form of a runtime-image, enables the program to execute in the target software environment.

More specifically, the disclosed embodiments provide a method and system for customizing the generation of a runtime-image for a software program. First, the disclosed embodiments provide an extendable linker that is capable of hosting one or more code-based pluggable components. Each of these pluggable components may encapsulate a transformation and/or a manipulation that may be applied to the code and/or resources of the program. By allowing the program developer/user to specify a sequence of pluggable components to apply during the linking-phase of the program, the disclosed embodiments may allow the program developer/user customize, with more granularity, the structure and behavior of the produced runtime-image.

Generating a runtime-image for the program involves a multi-step process. A static compiler may compile source code into intermediate code. Further, the linker may apply a specified sequence of pluggable components to transform the intermediate code one or more times. The pluggable components in the specified sequence may be referred to as pluggable transforms. One or more of the pluggable transforms in the sequence may apply transformations that optimize the intermediate code. Subsequent to applying the sequence of pluggable transforms, the linker may use the optimized intermediate code to generate a runtime-image of the program.

Applying optimizations to intermediate code at link-time may provide advantages over optimizations applied during static compilation. For instance, without knowing certain aspects of the program's codebase (i.e. closed-world knowledge of the program), certain whole-program optimizations cannot be made without risk of introducing errors into the program. In contrast, the linker may expose, to the pluggable components it is hosting, the program's codebase, thereby enabling one or more of the pluggable components to perform whole-program optimizations to the intermediate code reliably. This may provide the advantage of a smaller and/or faster runtime-image. The disclosed embodiments may also provide advantages with regards to runtime compilation. For example, moving optimizations traditionally performed as a part of runtime compilation to link-time may reduce the program's overhead during execution. Other optimizations applied at link-time may also make the program more amendable to aggressive optimizations performed during runtime compilation.

In addition, the linker may accept pluggable components that are written by the program developer/user of the program and/or a user of the program. While a default set of pluggable components included with the linker may provide universally applicable optimizations, the program developer/user may possess certain insights into the program that may the creation of optimizations specific to the program. The program developer/user may then encapsulate these optimizations into one or more custom pluggable components and provide them to the linker, who will then apply the one or more custom pluggable components to the program's intermediate code and/or resources. Again, this may provide the advantage of a smaller and/or faster runtime-image.

Furthermore, the linker facilitates the process of generating runtime-images that target multiple software environments. The linker may host one or more pluggable components known as pluggable image builders, wherein each pluggable image builder handles the creation of runtime-images for a specific software environment. For example, one target software environment may support dynamic libraries while another target software environment may not. To facilitate the generation of runtime-images for each of these software environments, the linker may host (1) a pluggable image builder that is configured to produce a runtime-image that includes a directory of dynamic libraries and (2) a pluggable image builder that is configured to produce a single statically-linked image file. Thus, to retarget a program to a new software environment, the program developer/user may provide a pluggable image builder that is tailored to the new software environment.

Figure 1:
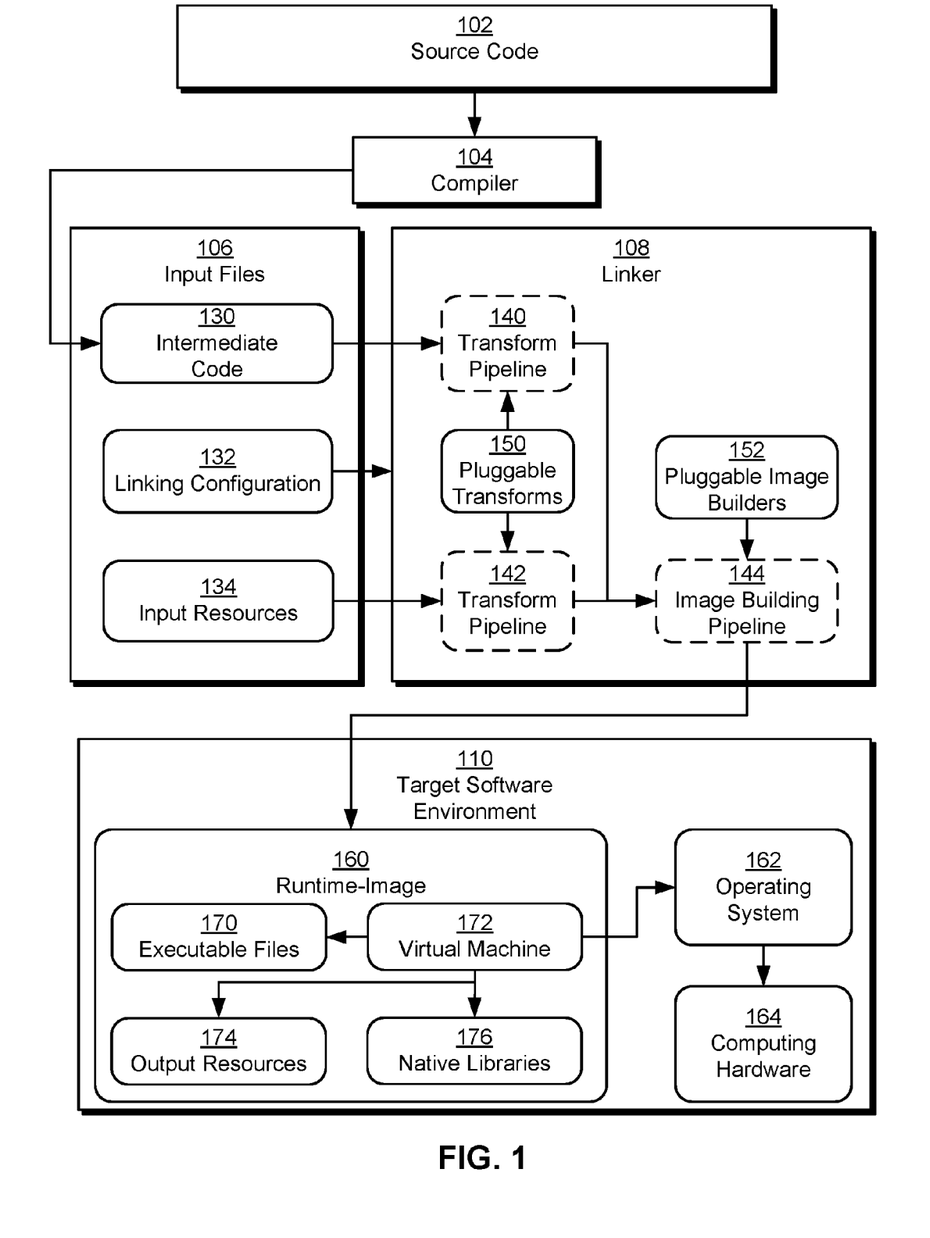
FIG. 1 shows a schematic of a system in accordance with the disclosed embodiments.

FIG. 1 shows a schematic of a system in accordance with the disclose embodiments. The system may be used for customizing the process of deploying, to target software environment 110, a program that is implemented by source code 102. As shown in FIG. 1, source code 102 may be at least partially compiled by compiler 104 into intermediate code 130. The intermediate code may be added to input files 106, which is conveyed to linker 108. Linker 108 uses at least a subset of the input files to generate runtime-image 160, which is deployed to execute in target software environment 110.

Source code 102 may refer to source code written to implement the program for which runtime-image 160 is being built. The program may be and/or include an application designed to execute on an operating system, an embedded application designed to execute directly on the firmware and/or hardware of a computing device, an enterprise application, a database, a shared library, a device driver, and/or any other type of program. Source code 102 may be written in any high-level programming language that may be compiled to an intermediate code via a compiler. Distributing a program in the form of architecture-neutral intermediate code facilitates porting the program across different computing platforms. For example, source code 102 may be written in the Java (Java™ is a registered trademark of Oracle America, Inc.) programming language and compiler 104 may be a Java compiler. Compiler 104 may then compile source code 102 to produce Java bytecode, which may be executed on any software environment that includes a Java Virtual Machine (JVM). In some embodiments, source code 102 may correspond to a set of text files containing source code (i.e. source code files). For example, a source code file may be a Java file, which is a file that contains Java code and has a ".java" filename extension.

Compiler 104 may be any static compiler configured to receive one or more source code files and translate the source code within each file into intermediate code. For example, compiler 104 may be a Java compiler, which may receive a set of Java files and compile the Java code within each Java file into Java bytecode. In some embodiments, compiler 104 may output a set of one or more files containing intermediate code. These code files may be referred to as intermediate code files.

During compilation, compiler 104 may apply, to source code 102, one or more optimizations of limited scope. For example, the compiler may apply an optimization that transforms code within a basic block, which is a piece of code with no jumps in or out of the middle of the block. Additionally, the compiler may apply an optimization that transforms code within a function, i.e., a function-wide optimization. However, compilers may not be well-suited to performing whole-program optimizations that are applied across function and file boundaries. This is because safely applying whole-program optimizations often requires analyzing the program as a whole. Compilers, on the other hand, generally work at the file level. Thus, it may be advantageous to have the application of whole-program optimizations occur at link-time rather than at compile-time. Additionally, in some embodiments, one or more optimizations traditionally performed at compile-time may be moved to be performed at link-time.

Input files 106 may correspond to a set of files used by linker 108 to generate runtime-image 160. Input files 106 may include intermediate code 130, linking configuration 132, and input resources 134.

Intermediate code 130 may refer to code written and/or generated to implement the program for which runtime-image 160 is being built. Intermediate code 130 may be written in any intermediate language that may be efficiently executed by an interpreter and/or compiled to machine language via a second compiler. Unlike high-level programming languages, which may be designed for human-readability, intermediate languages may sacrifice readability for simplicity. This simplicity may simplify the implementation of associated interpreters and/or Just-in-Time (JIT) compilers enough for easy porting across multiple computing platforms. This paradigm frees the developer from having to port the program, which may be more complex. In some embodiments, intermediate code 130 may correspond to a set of intermediate code files that was produced by a compiler. For example, intermediate code files produced by a Java compiler may correspond to a set of Java class files. A Java class file is a file that contains Java bytecode and has a ".class" filename extension. Additionally, Java class files contained in intermediate code 130 may be organized into one or more Java modules and/or Java Archive (JAR) files. A Java module may be a deployable, manageable, natively reusable, composable, stateless unit of software that may provide a concise interface to consumers and define its own dependencies on one or more other Java modules.

Linking configuration 132 may include one or more configuration parameters that configure how linker 108 builds runtime-image 160. These parameters may be contained within one or more configuration files that are accessed by linker 108, or passed along via command-line parameters. Additionally, parameters from linking configuration 132 may be passed to one or more pluggable components within linker 108.

Input resources 134 may include one or more resources that are needed to complete runtime-image 160. Resources may include one or more text strings, icons, documentation, legal documents, text files, picture files, audio files, video files, data files, and other data. Resources may also be conveyed to linker 108 where various transformations are applied.

Linker 108 may correspond to an extendable linker capable of building runtime-image 160 from input files 106. Linker 108 may be a standalone executable that may be invoked from the command line and/or a component of an integrated development environment (IDE) that is automatically invoked after the IDE's compilation phase. Linker 108 may also host one or more pluggable components, which may include pluggable transforms 150 and pluggable image builders 152. Prior to the execution of linker 108, the linker may not be aware of the pluggable components. Rather, the pluggable components may be dynamically discovered at link-time.

Pluggable transforms, in particular, encapsulate transformations that may be applied by linker 108 to input files 106. For example, one pluggable transform, when applied to an intermediate code file, may filter the intermediate code by removing one or more dead code paths. Another pluggable transform may convert a picture file from a lossless format to a lossy format.

Multiple pluggable transforms may be sequentially applied to an input file. More specifically, input files may be conveyed across a transform pipeline, wherein at each stage of the pipeline, the linker applies a pluggable transform to the input file, before conveying the input file to the next stage. In some embodiments, more than one transform pipelines exist, wherein each transform pipeline accepts a different type of input. For example, linker 108 may convey intermediate code files to transform pipeline 140, wherein one or more pluggable transforms, which are configured to operate on intermediate code, are applied. Linker 108 may also convey resources from input resources 134 to transform pipeline 142, wherein one or more other pluggable transforms, which are configured to operate on one or more types of resources are applied. In some embodiments, pluggable transforms configured to operate on intermediate code are placed in a transform pipeline that receives intermediate code. Additionally, in some embodiments, pluggable transforms configured to operate on resources are placed in a transform pipeline that receives resources. In some embodiments, linker 108 may include one or more transform pipelines that are configured to receive resources of a single type and/or file type, wherein the pluggable transforms applied in each of these transform pipelines are each configured to operate on that single type and/or file type. For example, linker 108 may include a transform pipeline that accepts only audio files and another transform pipeline that accepts only picture files. Pluggable transforms are discussed in further detail below with respect to FIGS. 2-5.

Pluggable image builders, in particular, focus on deploying the program to various software environments. Pluggable image builders 152 may include one or more pluggable image builders that are each configured to build a runtime-image for a different target software environment. In some embodiments, unlike pluggable transforms, only one pluggable image builder may be selected for each runtime-image built. As shown in FIG. 1, after the application of one or more pluggable transforms to intermediate code 130 and input resources 134 in transform pipelines 140 and 142 respectively, the outputs of both transform pipelines are conveyed to image building pipeline 144. Then, depending on the target software environment, which may be specified in linking configuration 132, linker 108 selects a pluggable image builder from pluggable image builders 152. After the selected image builder builds a runtime-image, linker 108 may then apply one or more pluggable post-processing operations to the newly built runtime-image to create runtime-image 160. Pluggable image builders and pluggable post-processing operations are discussed in further detail below with respect to FIGS. 2 and 4.

Target software environment 110 may correspond to any computing system and may include computing hardware 164, which may correspond to a smartphone, a cell phone, a personal digital assistant (PDA), a laptop computer, a desktop computer, a tablet computer, a server, a cluster of servers, a hypervisor, a container, or an embedded system. In some embodiments, the program may operate directly upon the computing hardware. If the program is an application, target software environment 110 may additionally include operating system 162. As shown in FIG. 1, runtime-image 160 may execute on top of the operating system. In some embodiments, the program may operate within the environment of an application, e.g. Internet browser, which runs on an operating system. For example, the program may correspond to an applet designed to load and execute in a web page displayed on the Internet browser.

Runtime-image 160 may correspond to the program in an executable form that is compatible with target software environment 110. For example, in embodiments where the runtime-image is configured to execute on operating system 162, runtime-image 160 possesses all software dependencies needed to execute on the operating system. However, runtime-image 160 may still make system calls to operating system 162 when it needs the operating system to perform a system function (e.g. output text to the physical monitor). Runtime-image 160 may include executable files 170, virtual machine 172, output resources 174, and native libraries 176. Executable files 170 may correspond to one or more files configured to execute on virtual machine 172. Virtual machine 172 may include an interpreter and/or a JIT compiler for executing, in target software environment 110, intermediate language instructions found in executable files 170. In some embodiments, executable files 170 may include intermediate code and/or machine language. Output resources 174 may correspond to one or more resources whose data is accessed by virtual machine 172 as the virtual machine executes instructions contained in executable files 170. In some embodiments, output resources 174 may include optimized versions and/or transformed versions of files found in input resources 134. Native libraries 176 may include one or more dynamic and/or shared libraries that contain code that natively is compatible with target software environment 110. During the execution of runtime-image 160, instructions within executable files 170 may cause virtual machine 172 to invoke routines found within native libraries 176. In some embodiments, these routines may be invoked when system calls are made to operating system 162.

Figure 2:
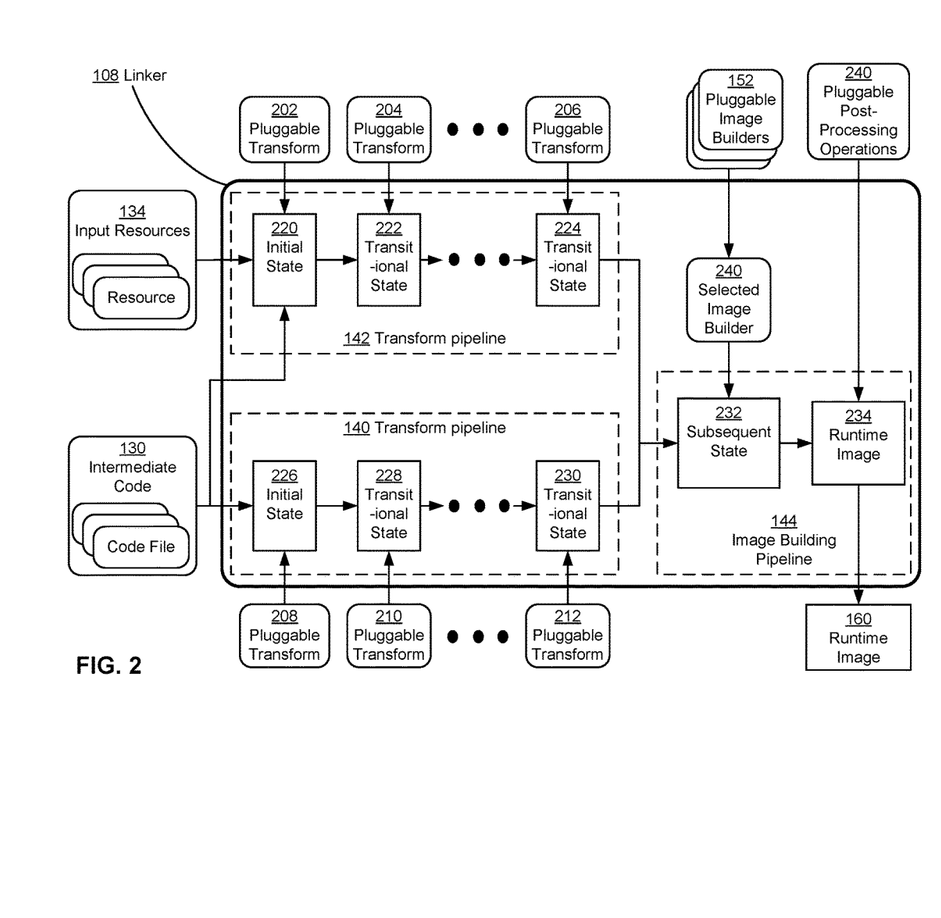
FIG. 2 shows a process of generating a runtime-image in accordance with the disclosed embodiments.

FIG. 2 shows another schematic of the system that focuses on how pluggable components are applied to files conveyed to the linker. While linker 108 may provide a default set of pluggable components, the program developer/user may install additional pluggable components obtained from third parties. Additionally, the program developer/user may write one or more pluggable components that encapsulate optimizations specific to the program. This logical separation between (1) the linker and (2) pluggable components hosted by the linker facilitates customizing the structure and behavior of a program's runtime-image.

A pluggable component may exist within the program's development environment as a file. This file may be a shared library, an archive, a module, and/or a text file containing code that implements the pluggable component's encapsulated functionality. In some embodiments, pluggable components are implemented in intermediate code. Additionally, multiple pluggable components may be provided within a single archive file or module. For example, a Java module that is loaded by linker 108 may include multiple pluggable components. To make a pluggable component discoverable, the file corresponding to the pluggable component may be placed in a directory where linker 108 is configured to search for pluggable components. When linker 108 is invoked, the linker may automatically load a default set of pluggable components. Additionally, the linker may access the configured directory for discovering additional pluggable components.

The program developer/user may use various methods to specify one or more pluggable components to be applied to input files 106. If the linker is invoked from the command line, the program developer/user may provide a first set of command-line parameters to specify the one or more pluggable components. Additionally, the program developer/user may include a second set of command-line parameters that are forwarded to the one or more pluggable components to serve as their parameters. In some embodiments, the program developer/user modify linking configuration 132 to specify the one or more pluggable components and their associated parameters.

As shown in FIG. 2, the program developer/user may choose to apply pluggable transforms 208-212 to intermediate code 130. When linker 108 is invoked, intermediate code 130 may be conveyed to linker 108 as a set of intermediate code files. In some embodiments, the set of intermediate code files may be provided as one or more directories, archive files, and/or modules. For example, intermediate code 130 may be provided to linker 108 as one or more Java modules, which were constructed by compiler 104.

Intermediate code 130 may be conveyed to linker 108 in a number of ways. In some embodiments where linker 108 is part of an IDE, the IDE may pass intermediate code 130 to linker 108 after the compilation phase. If the linker is invoked via the command-line, the intermediate code files that make up intermediate code 130 may be passed to the linker as a command-line option. Alternatively, a configuration file may direct the linker to a directory that contains the intermediate code files.

As shown in FIG. 2, after intermediate code 130 is received at transform pipeline 140, one or more pluggable transforms may be applied to intermediate code 130, rendering the intermediate code into a different state at each stage of the pipeline. More specifically, intermediate code 130 enters transform pipeline 140 in initial state 226. Initial state 226 may correspond to a modeled representation of intermediate code 130 that is loaded into memory before any pluggable transforms are applied. Further, linker 108 may apply pluggable transform 208 to intermediate code 130 in initial state 226. This enables pluggable transform 208 to change initial state 226 to transitional state 228.

Linker 108 then selects the next pluggable transform in the pipeline and applies it to transitional state 228, which changes transitional state 228 into yet another transitional state (not shown in the FIG. 2). As shown in FIG. 2, linker 208 may sequentially apply one or more additional pluggable transforms between the applications of pluggable transforms 210 and 212, further changing intermediate code 130's state each time a transformation is applied. Eventually, after the application of all pluggable transforms prior to pluggable transform 212, intermediate code is in transitional state 230. Further, the linker applies pluggable transform 212 to transitional state 230. The output of this application is combined with the output of transform pipeline 142 to create subsequent state 232, which may include both intermediate code and resources in various states of transformation. In some embodiments, at least some of the states of intermediate code 130, which may include initial state 226 and transitional states 228-230, may be loaded into memory. In some embodiments, at least some of the states of intermediate code 130 may include one or more file resource objects that correspond to one or more intermediate code files of intermediate code 130.

It should be noted that pluggable transforms configured to operate on intermediate code may belong to one or more categories of pluggable transforms, which may include a code-filtering category, code-optimization category, code-sorting category, and code-compaction category. Pluggable transforms in the code-filtering category may filter dead and/or unnecessary code from intermediate code 130. For example, in response to determining that a code path within intermediate code 130 will never be reached, a code-filtering pluggable transform may excise the code path from intermediate code 130. Other examples of transformations performed by code-filtering pluggable transforms include removing unused classes, removing unused methods, removing unused global variables, removing unused constants, and/or removing unused exception handling code.

Pluggable transforms in the code-optimization category may rearrange and/or transform intermediate code 130 to increase efficiency. Examples of transformations performed by code-optimization pluggable transforms may include inlining function calls, eliminating and/or merging redundant and/or duplicate calculations, eliminating redundant constants, merging equivalent functions and/or methods, replacing dynamic forms and/or operations with static forms and/or operations respectively (e.g. binding, reflection), and/or moving loop invariant code outside of a loop. Pluggable transforms in the code-sorting category may rearrange sections of intermediate code 130 based at least in part on how often, how likely, and/or how soon the code section will be executed. For example, a code-sorting pluggable transform may rearrange Java classes within Java bytecode so that more popular and/or important classes appear earlier in intermediate code 130. This rearrangement may affect the structure of runtime-image 160 and/or the structure of one or more files in the runtime-image. Pluggable transforms in the code-compaction category may handle the compression of one or more intermediate code files and/or sections of intermediate code within one or more intermediate code files.

In cases where multiple transformations are to be applied to intermediate code 130, the application of a particular transformation may preclude and/or complicate the application of another later transformation. For example, compacting the intermediate code before filtering the intermediate code may interfere with the filtering. Thus, the linker may apply pluggable transforms in an order based on category. For example, linker 108 may apply pluggable transformations in the code-filtering category, then apply pluggable transformations in the code-optimization category, then apply pluggable transformations in the code-sorting category, and then apply pluggable transformation in the code-compaction category. Additionally, while pluggable transforms within a category may generally be applied in any order, the program developer/user may specify an order to apply pluggable transformations within a category.

Figure 3:
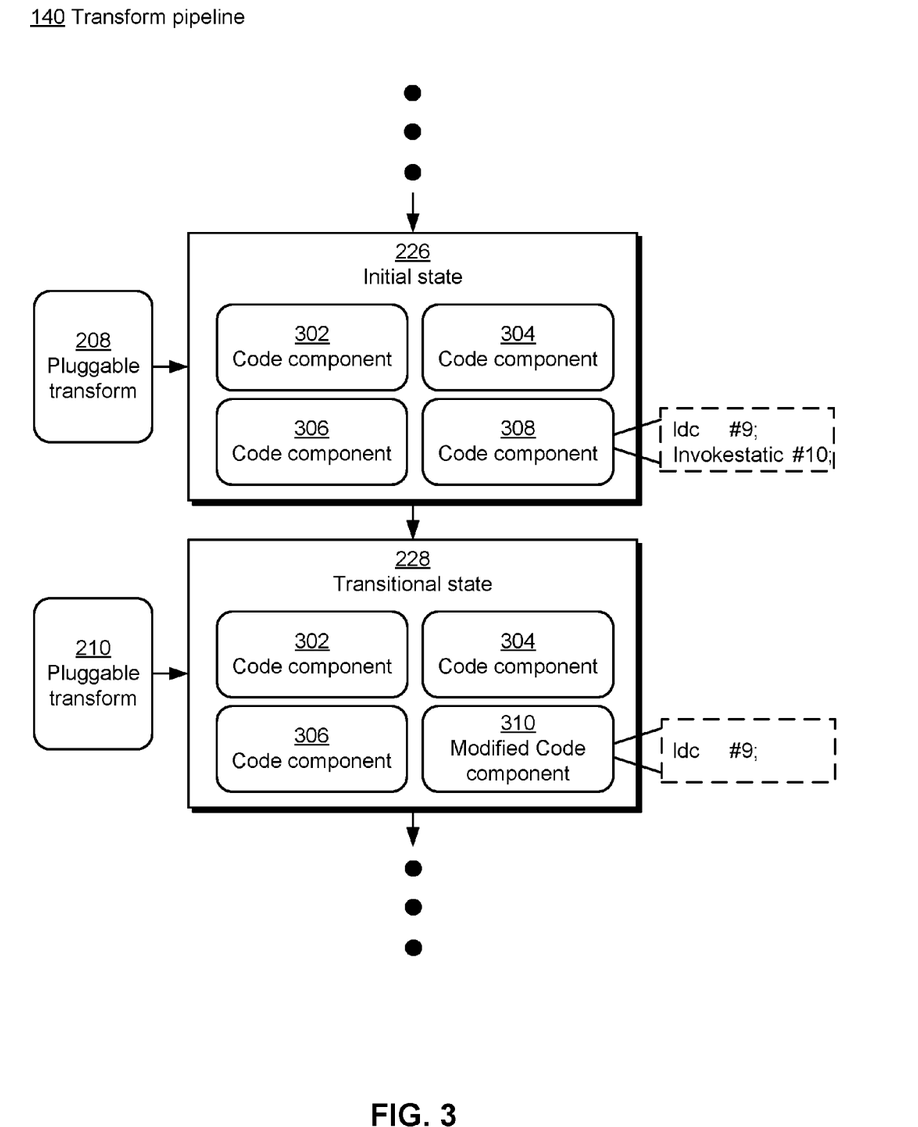
FIG. 3 shows an application of a pluggable transform in accordance with the disclosed embodiments.

FIG. 3 shows another schematic of the system that focuses on the application of a pluggable transform to a state of the intermediate code. As previously shown in FIG. 2, linker 108 loads a modeled representation of intermediate code 130 into memory as initial state 226. As shown in FIG. 3, initial state 226 includes code components 302-308 while transitional state includes code components 302-306 and modified code component 310. Code components 302-308 each correspond to a modeled representation of a code component in the intermediate code. In embodiments where the program is written in an object-oriented language, intermediate code 130 may be logically divided into one or more classes, interfaces, and/or other coding constructs used as extensible templates for creating objects, which implement the program. If intermediate code 130 is compiled from Java code, intermediate code 130 may be logically divided into Java classes where code components 302-308 each correspond to a modeled representation of a Java class.

Code component 308, as a modeled representation of a Java class, may store Java bytecode that implements all functionality encapsulated within the Java class. For instance, the Java class represented by code component 308 may contain the following Java code: "Class.forName ("java.lang.String")." This statement, may have been previously compiled into the following Java bytecode (with comments):

```
       // "java.lang.String"
       ldc         #9;
       // Method java/lang/Class.forName:(Ljava/lang/String;
       Invokestatic  #10;
```

As can be seen above, the first bytecode instruction loads the string "java.lang.String," which may be a fully qualified name of a class provided by Java, and the second bytecode instruction invokes the method java.lang.Class.forName (String className) with the loaded string. Additionally, code component 308 may include the first and second bytecode instructions. Further, as shown in FIG. 3, pluggable transform 208 is applied to code components 302-308. If pluggable transform 208 is of the code-optimization category, the pluggable transform may transform existing code in each of the code components into more efficient equivalent code. Pluggable transform 208, while searching for Java bytecode to optimize, may determine that the first and second bytecode instructions can be replaced with a single bytecode instruction. Further, pluggable transform 208 may replace, within code component 308, the first and second bytecode instructions with a new single bytecode instruction:

```
       // Class java.lang.String
       ldc         #17;
```

As can be seen above, the new bytecode instruction loads the Java class that corresponds to the string "java.lang.String" directly, which may be more efficient than the first and second bytecode instructions.

As shown in FIG. 3, the application of pluggable transform 208 may result in only one code component being transformed, which is represented by the replacement of code component 308 with modified code component 310 in transitional state 228.

In some embodiments, each pluggable transform may be implemented by one or more types, interfaces, and/or classes. For example, pluggable transform 208 may be implemented by the class FilterBytecodeTransform:

```
   class FilterBytecodeTransform implements BytecodeTransform {
       FilterBytecodeTransform(. . .) throws IOException {
           . . .
       }
       public String getName( ) {
           . . .
       }
       public void visit(. . . /* Bytecode object */) throws
```

-continued

```
       Exception {
           . . .
       }
   }
```

As can be seen in the above example code template, FilterBytecodeTrans form implements the BytecodeTrans form interface and includes a constructor, a public method that returns the pluggable transform's name, and a second method "visit" that implements the visitor pattern. People skilled in the art may appreciate that the visitor pattern may use double dispatch to separate the transformation algorithm (i.e. the pluggable transform) from the structures (i.e. the code components) on which the transformation algorithm is applied. More specifically, code components 302-308 may correspond to instances (i.e. code component instances) of a Java class that exposes an "accept" method. When applying pluggable transform 208 to initial state 226, code components 302-308 may each invoke the accept method to accept an instance of the FilterBytecodeTransform class, which causes the visit method to be invoked. Each time the visit method is invoked, the FilterBytecodeTrans form instance may receive a different code component instance, thereby enabling the FilterBytecodeTrans form instance to perform the transformation on multiple code component instances. In some embodiments, BytecodeTrans form instances may request a plurality of code component instances or all of the code components instances within intermediate code 130's modeled representation at once rather than a single code component instance. This allows a pluggable transform to apply its transformation to a plurality or all code components at once, rather than to one code component at a time.

It should be noted that because pluggable transforms within linker 108 have access to closed-world knowledge of the program, these pluggable transforms are capable of applying whole-program optimizations to the program. The codebase of the program may refer to the entire set of intermediate code from which runtime-image 160 is to be built from and may include the set of all code instructions that a process executing the program has a non-zero chance of reaching. The codebase may include (1) code written specifically for the program, (2) libraries that implement functionality on which the specifically-written source code directly depends on, and (3) libraries that the specifically-written source code transitively depends on. In general, a code segment may be dependent on a library if, (1) the code calls a method provided by the library and/or (2) the code introduces a subtype of a type provided by the library. For example, if code within a program calls a method defined in a first library, the program may have a direct dependency on the first library. If the first library additionally introduces a subtype of a type defined in a second library, the program may have a transitive dependency on the second library. Hence, the program's codebase would include both the first and second libraries. Additionally, the program's codebase may include static dependencies, dynamic dependencies, compile-time dependencies, link-time dependencies, and/or runtime dependencies of code specifically written for the program. On the other hand, even if the program executes on top of an operating system and makes system calls that are handled by the operating system, the program's codebase may not include the operating system. While the program is executing, the program may engage in inter-process communication with other executing programs via shared files, message passing, sockets, pipes, remote procedure calls (RPCs), or web-based APIs. However, the program's codebase may not include the other programs.

For example, the program may include (1) a first set of one or more Java modules, each containing one or more Java classes that were compiled from Java files written specifically for the program, (2) a second set of one or more Java modules that the first set of modules directly depends on, and (3) a third set of one or more Java modules that the first set of modules transitively depends on. Linker 108 may require the first, second, and third sets of Java modules to be included in input files 106 to build runtime-image 160, wherein the runtime-image is configured to execute independently on target software environment 110 (i.e. no dangling references). Additionally, one or more pluggable transforms may be granted access to the modeled representations of all Java classes in all Java modules included in the first, second, and third sets of Java modules. It thus follows that one or more of the pluggable transforms may have access to closed-world knowledge of the program.

Pluggable transforms may consider available closed-world knowledge of the program to make certain assumptions about the program. Pluggable transforms may then rely on the assumption to safely apply whole-program optimizations and/or transformations to the code. For example, a code-filtering pluggable transform may determine from closed-world knowledge of the program that the number of calls made to a public method of a class throughout the program's codebase is zero. Thus, the code-filtering pluggable transform may assume that the public method is not needed. Based at least in part on this assumption, the code-filtering pluggable transform may safely remove the public method from intermediate code 130.

In another example, a code-filtering pluggable transform may determine from closed-world knowledge of the program that the number of reads made to a global static variable throughout the program's codebase is zero. Thus, the code-filtering pluggable transform may assume that the global static variable is not needed. Based at least in part on this assumption the code-filtering pluggable transform may safely remove the global static variable from intermediate code 130.

In another example, a code-filtering pluggable transform may determine from closed-world knowledge of the program that the number of references made to a public class throughout intermediate code 130 is zero. Thus, the code-filtering pluggable transform may assume that the public class is not needed. Based at least in part on this assumption the code-filtering pluggable transform may safely remove the public class from intermediate code 130.

In another example, a code-optimization pluggable transform may determine from close-world knowledge of the program that a global variable may have the same value at all possible points in the program's execution. Thus, the code-optimization pluggable transform may replace the global variable with a global constant.

In another example, a code-sorting pluggable transform may use closed-world knowledge of the program to rank classes within intermediate code 130 by how soon, how likely, and/or how often the classes may be referenced during the program's execution. In doing so, the code-sorting pluggable transform may determine that a first class is used the most often while a second class is used the least often. The code-sorting pluggable transform may then rearrange classes within intermediate code 130 so that more popular classes are positioned closer to the beginning of runtime-image 160, wherein the first class is positioned closest to the beginning of runtime-image 160 and the second class is positioned farthest from the beginning of runtime-image 160.

In some embodiments, a pluggable transform may use close-world knowledge of the program to create a transitive closure of the program's dependencies and analyze the transitive closure to make one or more assumptions about the program.

As shown in FIG. 2, program developer/user may choose to apply pluggable transforms 202-206 to input resources 134. When linker 108 is invoked, input resources 134 may be provided to linker 108 as a set of resources. In some embodiments, the set of resources files may be provided as one or more directories of files and/or archive files. For example, input resources 134 may be provided to linker 108 as a directory containing one or more picture files, text files, binary files, video files, and/or audio files. This directory may be provided to linker 108 as a command-line parameter or via a configuration file. Once received, linker 108 conveys input resources 134 to transform pipeline 142. In some embodiments, linker 108 may additionally convey intermediate code 130 to transform pipeline 142. While, transform pipeline 142 may be configured to apply transformations to members of input resources 134, some of these transformations may be based at least in part on intermediate code of the program and/or closed-world knowledge of the program.

As linker 108 conveys input resources 134 through transform pipeline 142, a number of pluggable transforms may be applied to resources of input resources 134, rendering input resources 134 into a different state at each stage of the pipeline. More specifically, input resources 134 enters transform pipeline 142 in initial state 220. Initial state 220 corresponds to a modeled representation of input resources 134 that is loaded into memory before any pluggable transforms are applied. Pluggable transforms 202-206 are applied to input resources 134, rendering the input resources into a series of different states that include initial state 220 and transitional states 222-224. Eventually, transform pipeline 142 outputs input resources 134 in a transitional state, which is combined with the output of transform pipeline 140 to create subsequent state 232. In some embodiments, at least some of the states of input resources 134, which may include initial state 220 and transitional states 222-234, may be loaded into memory. In some embodiments, at least some of the states of input resources 134 may include one or more file resource objects that correspond to one or more resources of input resources 134.

It should be noted that pluggable transforms configured to operate on resources may belong to one or more categories of pluggable transforms, which may include a resource-filtering category, resource-optimization category, and resource-compaction category. Pluggable transforms in the resource-filtering category may filter out unnecessary resources. For example, using closed-world knowledge of the program, a resource-filtering pluggable transform may determine that one or more resources are never referenced and excise those references. In another example, a resource-filtering pluggable transform may determine that the runtime-image targets an English locality. In response, the pluggable transform may excise resources of one or more unused localities (e.g. all Greek resources).

Pluggable transforms in the resource-optimization category may rearrange, convert, and/or transform resources to optimize the runtime-image. For example, a resource-optimization pluggable transform may convert one or more image resources from a lossless format to a lossy format to reduce the size of the runtime-image. In another example, a resource-optimization pluggable transform may discover multiple textual resources (e.g. license documents) with identical names. In response, the resource-optimization pluggable transform may concatenate information from the identically-named resources into a single resource. Pluggable transforms in the resource-compaction category may handle the compression of one or more resources.

As shown in FIG. 2, after all chosen pluggable transforms are applied in their respective transform pipelines, the outputs of the transform pipelines may be combined into subsequent state 232, which is conveyed to image building pipeline 144. Further, linker 108 may determine from linking configuration 132, a software environment that is targeted by runtime-image 160. Linker 108 may then select the pluggable image builder that corresponds to the targeted software environment from a set of pluggable image builders 152. Linker 108 then applies selected image builder 240 to subsequent state 232. Because subsequent state 232 may include the intermediate code and resources depended upon by the program, selected image builder 240 may have everything necessary to build runtime-image 160.

As with other types of pluggable components, linker 108 may supply a default set of pluggable image builders that target one or more common software environments while making it possible for the program developer/user to provide custom pluggable image-builders via a specified directory or a command-line parameter. For example, if a program developer/user finds that the default set of pluggable image builders does not contain a pluggable image builder for building a runtime-image that is compatible with an uncommon computing platform that the program developer/user is targeting, the program developer/user may write a custom pluggable image-builder that builds runtime-images capable of executing on the uncommon computing platform.

Pluggable image builders 152 may include a pluggable image builder for building dynamically-linked runtime-images, a pluggable image builder for building statically-linked runtime-images, a pluggable image builder that targets one or more development environments, a pluggable image builder that targets one or more personal computing environments, a pluggable image builder that targets one or more mobile computing environments, and/or a pluggable image builder that targets one or more embedded environments.

When building the runtime-image, linker 108 may produce a single file, which is a linked representation of one or more of the intermediate code files and resources provided by subsequent state 232. The selected image builder may arrange files and resources provided by subsequent state 232 into a set of directories. Depending on the environment being targeted by the runtime-image, the directory structure may vary. For example, if the runtime-image is targeting a runtime environment, the directory structure may include a "bin" directory for executables, a "conf" directory for configuration files, a "lib" directory for libraries native to the target software environment, and/or a "man" directory for documentation. If the runtime-image is targeting a development environment, additional directories and files specific to development environments may be included in the runtime-image. In some embodiments, one or more configuration files and/or command-line parameters may be provided to specify the directory structure of the runtime-image. In some embodiments, linker 108 will use a perfect hashing algorithm to organize the files and the directories. Eventually, the selected image builder generates runtime-image 234, which may be a single memory-mapped file that contains a set of directories and files (e.g. a file system on a stick).

As shown in FIG. 2, pluggable post-processing operations 240 may be applied to runtime-image 234. Pluggable post-processing operations 240 may include one or more additional pluggable components that may be added to or removed from image building pipeline 144 after the image building operation. As with other types of pluggable components, linker 108 may supply a default set of pluggable post-processing operations while making it possible for the program developer/user to provide custom pluggable post-processing operations via a specified directory or a command-line parameter. Operations performed by pluggable post-processing operations 240 may include ahead-of-time (AOT) compilation, preverification, and class definition storage.

AOT compilation may involve compiling at least some of the intermediate code within the runtime-image to machine language, which may increase the execution speed of the runtime-image. Preverification may involve verifying intermediate code within runtime-image when the runtime-image is created. Verification may involve ensuring whether certain characteristics of the intermediate code within the runtime-image are proper and that the intermediate code is fit for execution on the virtual machine. For example, verification may involve ensuring that one or more Java classes are not corrupted or tampered with. By marking one or more of these classes as verified during the creation of the runtime-image, the verification operation may be skipped when the runtime-image is executed. Class definition storage involves loading one or more class files of intermediate code 130 into a memory image and storing it on disk. When the runtime-image is executed, instead of serially loading individual classes, the program may load the memory image as a single unit, which may speed up execution of the runtime-image. In some embodiments, the runtime-image may be embedded in another container, such as an executable segment.

Figure 4:
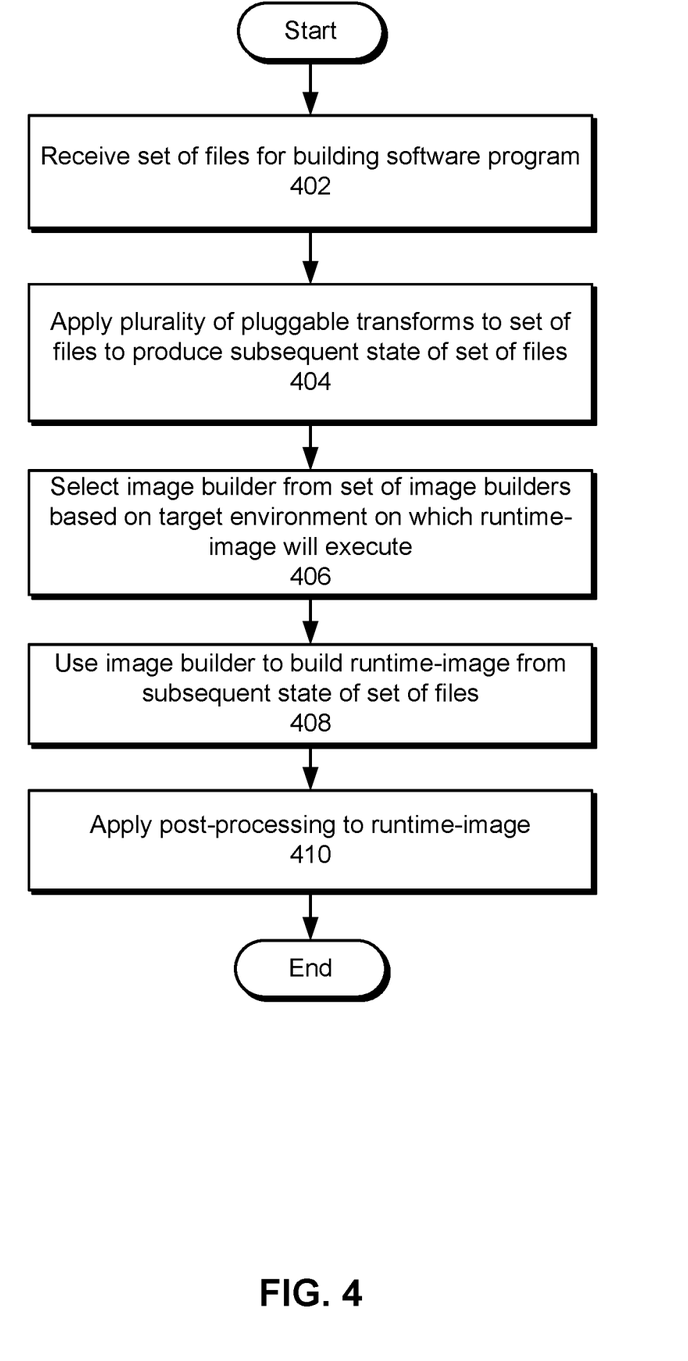
FIG. 4 shows a flowchart illustrating a process of generating runtime-images in accordance with the disclosed embodiments.

FIG. 4 shows a flowchart illustrating a process of customizing how runtime-images are generated in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, the linker receives a set of files for building a software program (operation 402). The set of files may include one or more intermediate code files and one or more input resources. The one or more intermediate code files may include code that was at least partially compiled by a compiler. Further, the linker applies a plurality of pluggable transforms to the set of files to produce a particular subsequent state of the set of files (operation 404). For example, the linker may place the set of files into a pipeline, wherein the linker applies a different pluggable transform to the set of files at each stage of the pipeline. The plurality of pluggable transforms may include pluggable transforms that belong to different categories of pluggable transforms. Additionally, the linker may apply certain categories of pluggable transforms before other categories. Further, the linker may select a pluggable image builder from a set of pluggable image builders based at least in part on a target software environment of the runtime-image (operation 406). For example, if the runtime-image is supposed to execute in an embedded environment, the linker may select an embedded runtime-image builder. The linker may then invoke the image builder to build the runtime-image from the particular subsequent state of the set of files (operation 408). Further, the linker may apply one or more post-processing operations to the runtime-image (operation 410).

Figure 5:
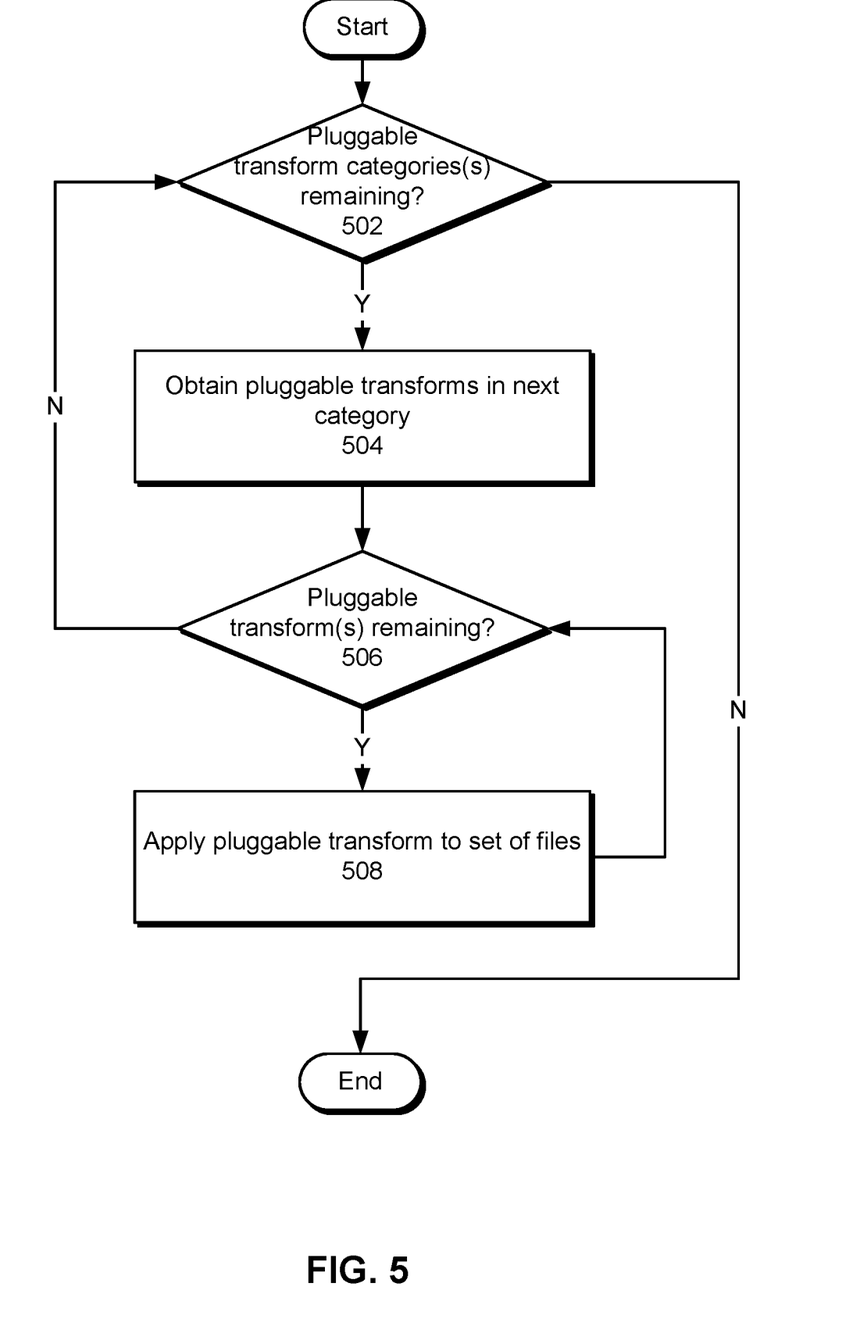
FIG. 5 shows a flowchart illustrating the process of generating runtime-images in accordance with the disclosed embodiments.

FIG. 5 shows a flowchart illustrating the process of customizing how runtime-images are generated in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

While applying a plurality of pluggable transforms to the set of files to produce the particular subsequent state of the set of files (see FIG. 4 above), the linker may step through a list of categories of pluggable transforms as it conveys the set of files through each stage of the pipeline, wherein the categories are arranged in a particular order. For example, the linker may be configured to apply all code-filtering pluggable transforms before applying any code-compaction pluggable transforms. Initially, the linker determines whether there are any categories of pluggable transforms that have not yet been applied (decision 502). If there are no categories remaining, then all pluggable transforms have been applied to the set of files to produce the particular subsequent state of the set of files. If there are categories remaining, the linker obtains all pluggable transforms in the next remaining category (operation 504). If the category has one or more remaining pluggable transforms (decision 506), the linker selects a pluggable transform from the one or more remaining pluggable transforms and applies it to the set of files (508). If the category has no remaining pluggable transforms, the linker moves on to the next category. In some embodiments, the linker may apply all pluggable transforms of a category in a particular order.

Figure 6:
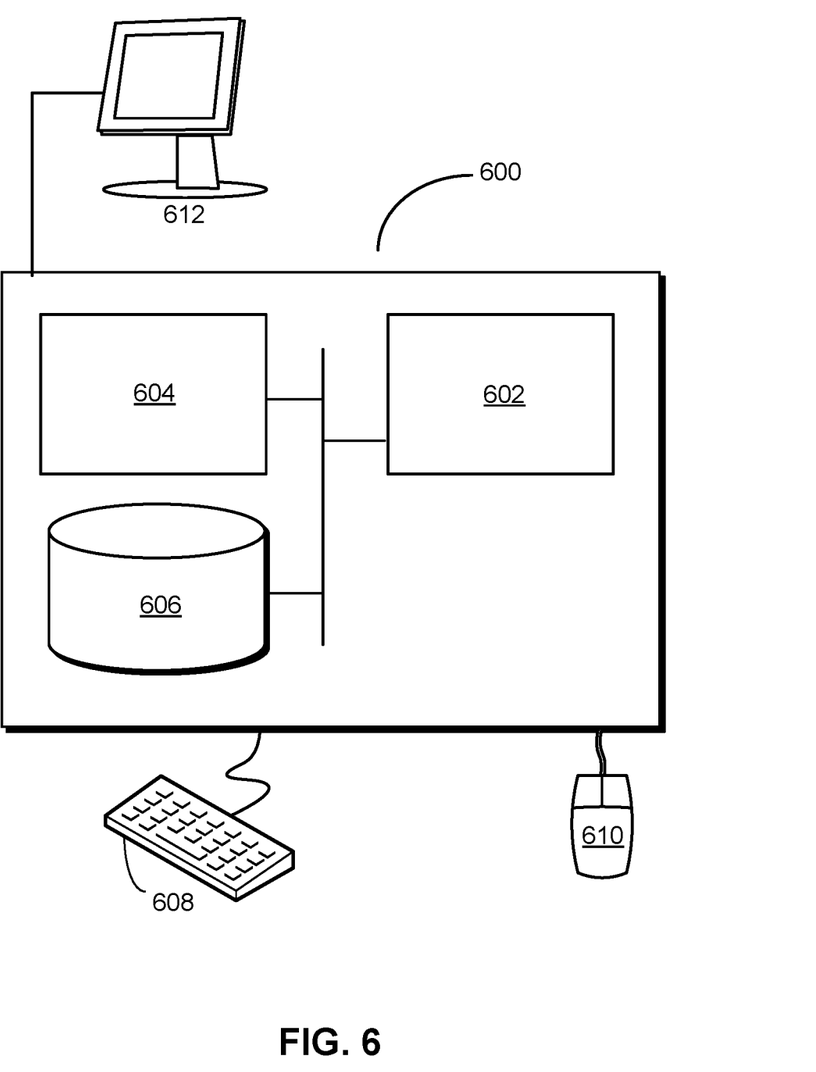
FIG. 6 shows a computer system in accordance with the disclosed embodiments.

FIG. 6 shows a computer system 600 in accordance with an embodiment. Computer system 600 may correspond to an apparatus that includes a processor 602, memory 604, storage 606, and/or other components found in electronic computing devices such as personal computers, laptop computers, workstations, servers, mobile phones, tablet computers, and/or portable media players. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software linker provided by the operating system.

In one or more embodiments, computer system 600 provides a system for facilitating the execution of a software program. The system may include an analysis apparatus that determines a structure of the software program and an execution context for the software program from a set of possible execution contexts for the software program. Next, the analysis apparatus may generate memory layouts for a set of object instances in the software program by applying the execution context to the structure independently of a local execution context on computer system 600. The analysis apparatus may use a set of artifacts associated with executing the software program and/or a set of logical representations of the object instances to generate the memory layouts and/or determine one or more metrics associated with each memory layout.

The system may also include a presentation apparatus that obtains the memory layouts and displays visualizations of the memory layouts (e.g., within a GUI). Each visualization may include graphical distinctions between data in the corresponding object instance and padding in the object instance, fields associated with different levels of an inheritance hierarchy of the object instance, and/or a portion of the object instance that is determined to inefficiently use memory space and a remainder of the memory space. The presentation apparatus may also display a memory consumption and padding size of the object instance and/or a ranking of object instances in the software program by potential memory savings.

In addition, one or more components of computer system 600 may be remotely located and connected to the other components over a network. Portions of the present embodiments (e.g., analysis apparatus, virtual machine instance, presentation apparatus, etc.) may also be located on different nodes of a distributed system that implements the embodiments. For example, the present embodiments may be implemented using a cloud computing system that improves the knowledge and management of memory consumption in a set of remote software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method, the method comprising:
   receiving a set of files for building a software program, wherein at least one of the files in the set is an intermediate code file that was at least partially compiled from a source code file of the software program;
   applying a plurality of pluggable transforms to a plurality of states of the set of files to produce a particular subsequent state of the set of files, comprising:
      applying a particular pluggable transform to modify the intermediate code file into a particular transitional state of the intermediate code file; and
      applying one or more subsequent pluggable transforms to modify the particular transitional state of the intermediate code file into one or more other transitional states of the intermediate code file; and
   producing a runtime-image of the software program from at least the particular subsequent state of the set of files, the runtime-image comprising one or more files for execution by a virtual machine and one or more output resources to be accessed by the one or more files for execution, wherein producing the runtime-image of the software program comprises:
      selecting an image builder from a set of pluggable image builders based on at least a target software environment on which the runtime-image will execute; and
      using the image builder to build the runtime-image from the particular subsequent state of the set of files; and
   operating pluggable post-processing by adding or removing one or more additional pluggable components to or from the runtime-image being produced.

2. The computer-implemented method of claim 1, wherein applying the plurality of pluggable transforms further comprises discovering at least one of the plurality of pluggable transforms.

3. The computer-implemented method of claim 1, wherein the set of files further comprises an input resource and applying the plurality of pluggable transforms further comprises applying one or more other pluggable transforms to modify the input resource into one or more transitional states of the input resource; and wherein at least one of the particular pluggable transform and the one or more subsequent pluggable transforms are applied exclusively to intermediate code files and at least one of the one or more other pluggable transforms are applied exclusively to input resources.

4. The computer-implemented method of claim 3, wherein a first set of intermediate code from which the runtime-image is to be produced is exposed to at least one of the plurality of pluggable transforms, the first set of intermediate code comprising a second set of intermediate code that is reachable by a process executing the software program.

5. The computer-implemented method of claim 4, wherein a modification performed by the at least one of the plurality of pluggable transforms depends on an assumption about the software program; and wherein, to make the assumption, the at least one of the plurality of pluggable transforms considers the second set of intermediate code.

6. The computer-implemented method of claim 5, wherein the modification that depends on the assumption comprises discovering at least one intermediate code path that is not reachable at any point during the software program's execution.

7. The computer-implemented method of claim 5, wherein the modification that depends on the assumption comprises eliminating intermediate code that is not used at any point during the software program's execution.

8. The computer-implemented method of claim 5, wherein the modification that depends on the assumption comprises at least one of: eliminating a duplicate calculation; and inlining a call to a routine.

9. The computer-implemented method of claim 3, wherein modifications performed by the particular pluggable transform and the one or more subsequent pluggable transforms comprise at least one of: a filtering of the intermediate code file; a sorting of the intermediate code file; and a compaction of the intermediate code file.

10. The computer-implemented method of claim 3, wherein modifications performed by the other pluggable transforms comprises at least one of: a filtering of the input resource; a conversion of the input resource; and a compaction of the input resource.

11. The computer-implemented method of claim 1, wherein the set of image builders comprise at least one of: a builder for building statically-linked runtime-images; a builder for building runtime-images for one or more development environments; and a builder for building runtime-images for one or more embedded environments.

12. The computer-implemented method of claim 1, wherein each of the plurality of pluggable transforms belong to a category of pluggable transforms; and wherein all pluggable transforms that belong to a first category of pluggable transforms are applied prior to applying any pluggable transforms that belong to a second category of pluggable transforms.

13. An apparatus, comprising:
one or more processors; and
memory storing instructions that, when executed by the one or more processors, cause the apparatus to:
receive a set of files for building a software program, wherein at least one of the files in the set is an intermediate code file that was at least partially compiled from a source code file of the software program;
apply a plurality of pluggable transforms to a plurality of states of the set of files to produce a particular subsequent state of the set of files, comprising:
applying a particular pluggable transform to modify the intermediate code file into a particular transitional state of the intermediate code file; and
applying one or more subsequent pluggable transforms to modify the particular transitional state of the intermediate code file into one or more other transitional states of the intermediate code file; and
produce a runtime-image of the software program from at least the particular subsequent state of the set of files, the runtime-image comprising one or more files for execution by a virtual machine and one or more output resources to be accessed by the one or more files for execution, wherein producing the runtime-image of the software program comprises:
selecting an image builder from a set of pluggable image builders based on at least a target software environment on which the runtime-image will execute; and
using the image builder to build the runtime-image from the particular subsequent state of the set of files; and
operating pluggable post-processing by adding or removing one or more additional pluggable components to or from the runtime-image being produced.

14. The apparatus of claim 13, wherein the set of files further comprises an input resource and applying the plurality of pluggable transforms further comprises applying one or more other pluggable transforms to modify the input resource into one or more transitional states of the input resource; and wherein at least one of the particular pluggable transform and the one or more subsequent pluggable transforms are applied exclusively to intermediate code files and at least one of the one or more other pluggable transforms are applied exclusively to input resources.

15. The apparatus of claim 14, wherein a first set of intermediate code from which the runtime-image is to be produced is exposed to at least one of the plurality of pluggable transforms, the first set of intermediate code comprising a second set of intermediate code that is reachable by a process executing the software program.

16. The apparatus of claim 15, wherein a modification performed by the at least one of the plurality of pluggable transforms depends on an assumption about the software program; and wherein, to make the assumption, the at least one of the plurality of pluggable transforms considers the second set of intermediate code.

17. One or more non-transitory computer-readable storage media storing instructions that when executed by a computer cause the computer to perform a method, the method comprising:
receiving a set of files for building a software program, wherein at least one of the files in the set is an intermediate code file that was at least partially compiled from a source code file of the software program;

applying a plurality of pluggable transforms to a plurality of states of the set of files to produce a particular subsequent state of the set of files, comprising:
   applying a particular pluggable transform to modify the intermediate code file into a particular transitional state of the intermediate code file; and
   applying one or more subsequent pluggable transforms to modify the particular transitional state of the intermediate code file into one or more other transitional states of the intermediate code file; and
producing a runtime-image of the software program from at least the particular subsequent state of the set of files, the runtime-image comprising one or more files for execution by a virtual machine and one or more output resources to be accessed by the one or more files for execution, wherein producing the runtime-image of the software program comprises:
   selecting an image builder from a set of pluggable image builders based on at least a target software environment on which the runtime-image will execute; and
   using the image builder to build the runtime-image from the particular subsequent state of the set of files; and
operating pluggable post-processing by adding or removing one or more additional pluggable components to or from the runtime-image being produced.

* * * * *

UNITED STATES PATENT AND TRADEMARK OFFICE
CERTIFICATE OF CORRECTION

PATENT NO.         : 9,841,953 B2                                    Page 1 of 1
APPLICATION NO.    : 15/210447
DATED              : December 12, 2017
INVENTOR(S)        : Laskey et al.

It is certified that error appears in the above-identified patent and that said Letters Patent is hereby corrected as shown below:

On the Title Page

Column 2, item (56) under Other Publications, Line 4, delete "Slang" and insert -- Clang --, therefor.

Signed and Sealed this
Third Day of July, 2018

Andrei Iancu
*Director of the United States Patent and Trademark Office*